Figure 1:
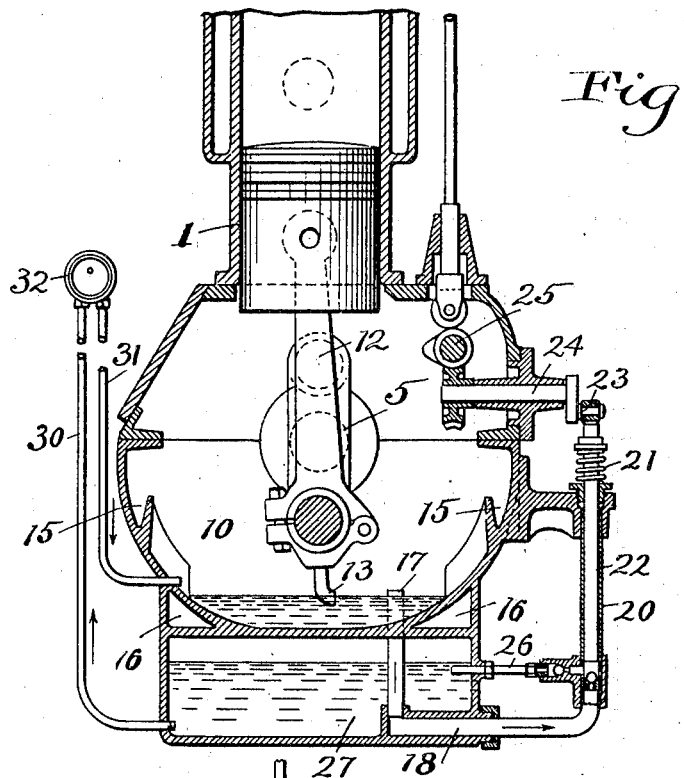

A. P. BRUSH.
OIL DISTRIBUTING MECHANISM.
APPLICATION FILED SEPT. 26, 1912.

1,112,975.

Patented Oct. 6, 1914.

Witnesses
E. B. Gilchrist
E. M. Freeman.

Inventor
Alanson P. Brush
by Thurston & Kwis
Attorneys

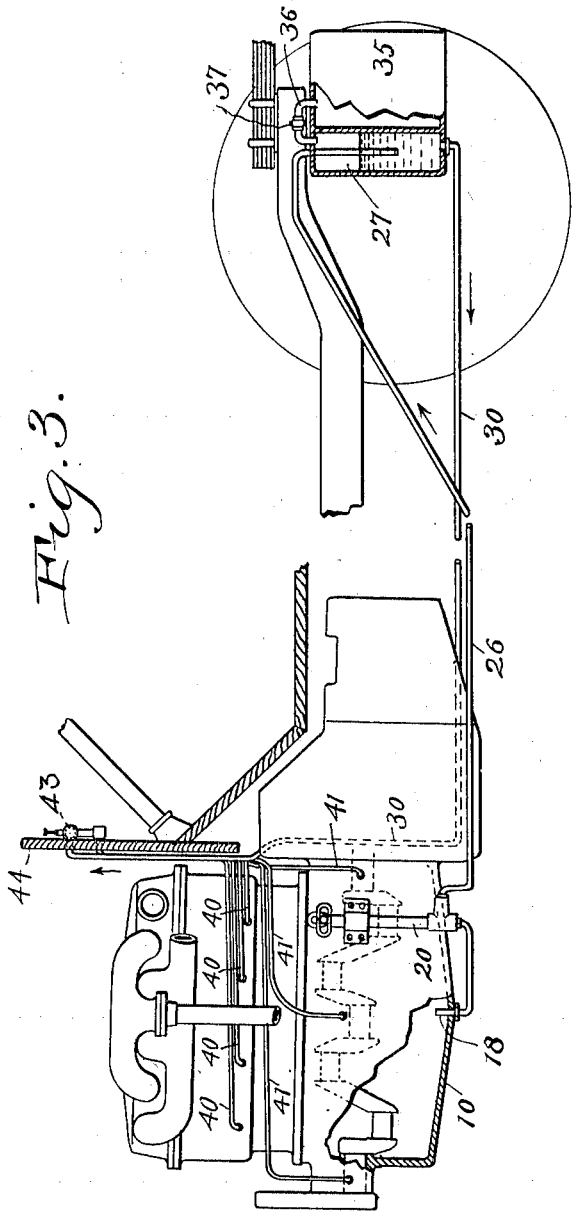

UNITED STATES PATENT OFFICE.

ALANSON P. BRUSH, OF FLINT, MICHIGAN.

OIL-DISTRIBUTING MECHANISM.

1,112,975.      Specification of Letters Patent.      Patented Oct. 6, 1914.

Application filed September 26, 1912. Serial No. 722,440.

*To all whom it may concern:*

Be it known that I, ALANSON P. BRUSH, a citizen of the United States, residing at Flint, in the county of Genesee and State of Michigan, have invented a certain new and useful Improvement in Oil - Distributing Mechanism, of which the following is a full, clear, and exact description.

The primary object of this invention is to effectively distribute and apply to parts needing it an ample, but not excessive, supply of lubricating oil. The invention seems to be most useful when used in connection with an automobile whose motor is a multi-cylinder internal combustion engine; and therefore the invention is shown in the drawing as applied to an automobile of the sort mentioned. In fact some of the features of invention, as defined by the appended claims, have to do with the application of the invention to this particular use. When so used, the invention has two main objects, viz. (1) to insure the ample lubrication of various parts of the motor without over lubricating the motor cylinders to a degree which will cause offensive smoking; and (2) to utilize one pump, which is primarily provided as a part of the lubricating scheme, for additionally maintaining such air pressure in the fuel tank as will cause the feeding of a suitable quantity of liquid fuel to the carbureter of the motor, however low the fuel or tank may be placed.

The invention consists essentially of the combination of an air tight oil tank, a conduit through which oil from said tank may be delivered for lubricating the moving parts requiring lubrication, a receptacle arranged to catch the oil so delivered, and a pump arranged to pump oil and air from said receptacle and to discharge oil or air, as the case may be, into said tank.

More specifically, the invention, when embodied in connection with an automobile, consists of an air tight tank, a conduit or conduits leading therefrom to a suitable oil delivery point (or points), a crank case whose lower portion serves to catch the oil delivered from said conduit or conduits, a single pump driven by the motor and connected on its suction side with said crank case so as to be able to withdraw the oil which rises thereon above a predetermined level, or air, when the oil is below that level, said pump being connected on its delivery side with the air tight tank.

The invention also consists, in addition to the parts specified, and in combination therewith, of the fuel tank and an open connection between the tops of the air tight oil tank and said fuel tank, so as to maintain equal pressure in both.

The invention also consists in some subordinate combinations, as will be fully set forth in the appended claims.

Figure 2:
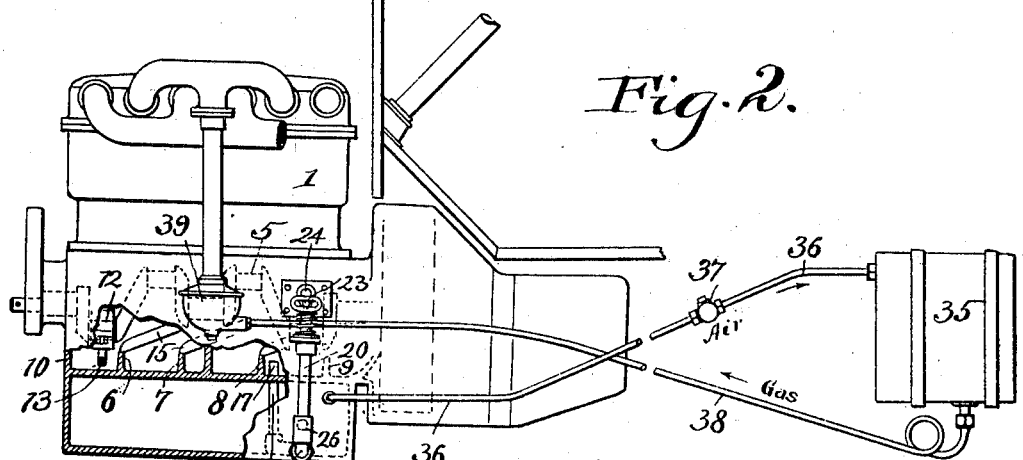

In the drawing, Figure 1 is a vertical transverse section of an internal combustion engine showing the present invention applied thereto. Fig. 2 is a side elevation of the same engine, with this invention applied thereto. In this view the lower part of the crank case is shown in vertical section. Fig. 3 is a side elevation, partly in vertical section, showing in what manner this invention will be applied to an automobile having an internal combustion engine for a motor, and a different system of oil distribution to the parts of said motor.

Figs. 1 and 2 show the invention applied to an automobile having a four-cylinder internal combustion engine for a motor, and having an oil distributing system which includes an oil receptacle arranged to contain oil which will be splashed onto the parts requiring lubrication. This splash lubricating mechanism is substantially the same as that which is fully shown and described in Letters Patent No. 1,041,735, granted to me October 22, 1912. In this construction the motor, as shown, is a four-cylinder internal combustion engine having four cranks on the crank shaft 5. This crank shaft is inclosed by a crank case 10 whose lower part serves as an oil receptacle which is divided by low partitions 6, 7, 8 and 9 into four pits. Each pit is below and is associated with one of the engine cylinders and its connecting rod and crank. Each connecting rod 12 carries an oil scoop or spoon 13 which, as the crank shaft revolves, will swing down into the associated pit and dip into the oil therein, and thereby pick some up. Some of this oil will lubricate the bearing of the connecting rod on the crank; some will be splashed onto the adjacent crank shaft bearing; some will be thrown into the associated engine cylinder 1; and some will be thrown against the side walls of the crank case. The oil taken from any pit and thrown onto the casing or associated cylinder wall will, as it runs down, be caught in grooves or pockets 15 formed on said side walls. These grooves or pockets adjacent to the three rear pits incline downward and forward, and each discharges the oil which it catches into the pit directly in front of that to which it is adjacent. The oil which splashes against the walls of the crank case adjacent to the front pocket finds its way into the passageway 16, through which it flows rearward and discharges into the rear pocket. This construction is old as stated, and the present invention is wholly independent of this particular construction, although when the invention is used in combination with this old oil circulating construction, a most efficient lubricating system results.

In one of the pits an overflow orifice 17 is arranged. This is preferably the open upper end of a pipe 18 which projects up into the pit to the plane in which it is desired to maintain the oil level in said pit. It might be stated here that the old oil circulating construction as described is such as will automatically cause the oil level in all of the pits to be substantially the same. Therefore only one overflow orifice is required; and it may be in any pit. A pump 20 is provided, and this connected at its suction side with the pipe 18. The pump may be of any suitable construction provided it is adapted to pump air as well as oil. It may be operated by any suitable mechanism. The drawing shows a spring 21 for operating the pump piston 22 on the suction stroke, and a crank 23 for operating it on the discharge stroke. This crank may be carried by a shaft 24 which may be driven from the cam shaft 25 of the engine.

The pump discharges through pipe 26 into an air tight oil tank 27 which may be placed in any convenient position. As shown, it is an integral part of and is below the crank case. Leading from this oil tank is a conduit which discharges into the oil receptacle in the crank case, and preferably into the same pit as that which is provided with the overflow orifice. This conduit, as shown, consists of the two pipes 30 and 31 and intermediate sight feed glass 32 which may be placed at any convenient point for observation. It serves no particular useful function, except that the operator can see the oil in circulation, and will know that so long as any oil is flowing the apparatus is operating properly, whether the flow of oil be much or little.

If the described apparatus contains a sufficient supply of oil it will operate properly, however great may be the excess of oil. This is not true with the oiling system first described, because if there be too much oil in the pits an excess of oil will be thrown into the engine cylinder and the engine will smoke. But with the addition of the present invention the pump 20 withdraws from the pitted oil receptacle in the crank case the excess of oil,—that is all of the oil above the oil overflow orifice. When the oil has been withdrawn by the pump and discharged into the air tight tank 27, the pump will thereafter pump air and discharge it into said tank, thereby creating such air pressure therein as will force air from the tank through the oil distributing conduits 30, 31 and 32.

The fuel tank 35 for the liquid fuel may be placed in any convenient place. A conduit in the form of a pipe 36 connects the top of the oil tank 27 with the top of the fuel tank and therefore the air pressure will be the same in both at all times. Some means should be provided for preventing the accumulation of too much air pressure in these tanks. A simple safety valve 37 may be connected with the pipe 36 for producing this result. Fuel will be discharged under pressure through pipe 38, and delivered into the carbureter 39.

Fig. 3 shows the invention applied to a specifically different lubricating system. The oil is delivered through various pipes 40 to the several engine cylinders and through the pipes 41 to the bearings for the engine crank shaft. The lower part of the crank case 10 is arranged to catch the excessive oil which is delivered from these pipes. Heretofore it has been the custom to pump the oil from an oil tank and deliver it to an elevated receptacle from which it flows through sight feed glasses to these oil distributing pipes; and great care has been taken to see that the rate at which the oil was so pumped did not exceed the consumption, because if it did the oil would sooner or later accumulate in the crank case in such an amount as would cause the very offensive smoking of the engine. In applying the present invention to this system, the pump 20 is connected on its suction side with an overflow pipe 18 which projects to the required height into the crank case. The delivery side of the pump is connected through a pipe 26 with an air tight oil tank 27, which, in the present case, is adjacent to and a part of the same structure which contains the fuel tank 35. An oil delivery pipe 30 is connected with this oil tank 27 and extends to a point where it can discharge oil into a little receptacle 43 fixed to the dash 44; and the oil flows from this receptacle through sight feed glasses into the oil pipes 40 and 41, as stated. A pipe 36 connects the fuel tank and oil tank, and may have connected with it a safety valve 37. With this construction it is not necessary to make any nice adjustment of the parts to regulate the quantity of oil pumped. In fact, the pump will withdraw from the oil receptacle all of the oil which rises above the overflow orifice,—be that much or little. It makes no difference how fast oil flows through the oil delivery conduit 30 and through pipes 41 back to the crank case. It may be necessary to regulate the size of the oil delivery pipes 40, if this can be done either by the usual valves or by making these pipes of such size that they cannot carry any excess.

Having described my invention, I claim:—

1. In lubricating mechanism for internal combustion engines, the combination of an air tight oil tank, an oil receptacle which is not air tight, a conduit connecting said tank and receptacle and through which oil may be forced from said tank into said receptacle by the air pressure in the former, a pipe leading from said oil receptacle and having its inlet end placed at a suitable elevation above the bottom of said receptacle, a pump constructed to pump either oil or air, which pump is connected on its suction side with the last mentioned pipe and is connected on its discharge side with said air tight oil tank.

2. In lubricating mechanism for internal combustion engines, the combination of an air tight oil tank, a conduit which leads from said tank to a suitable oil delivery point and through which oil may be forced by air pressure in the tank, an oil receptacle arranged to catch the oil discharged from said conduit, a pump connected on its suction side with said oil receptacle, and on its delivery side with said oil tank, said pump being constructed to pump oil or air, a fuel tank, and a conduit through which the top of the oil tank and the top of the fuel tank may be connected so as to maintain substantially the same air pressure in both.

3. In lubricating mechanism for internal combustion engines, the combination of an air tight oil tank, a conduit which leads from said tank to a suitable oil delivery point and through which oil may be forced by air pressure in the tank, an oil receptacle arranged to catch the oil discharged from said conduit, a pump connected on its suction side with said oil receptacle, and on its delivery side with said oil tank, said pump being constructed to pump oil or air, a fuel tank, a conduit through which the top of the oil tank and the top of the fuel tank may be connected so as to maintain substantially the same air pressure in both, and means which act automatically to prevent excessive air pressure in said tanks.

4. The combination with an internal combustion engine having a crank case which is not air tight, but which is arranged to hold lubricating oil, an air tight fuel tank, an air tight oil tank, a pump adapted to pump either oil or air, a pipe connecting said pump on its suction side with the crank case, means connecting the discharge side of said pump with said air tight oil tank, and an air line connecting said oil tank and fuel tank, whereby to maintain equal air pressure in both.

In testimony whereof, I hereunto affix my signature in the presence of two witnesses.

ALANSON P. BRUSH.

Witnesses:
E. L. THURSTON,
A. J. HUDSON.